Nov. 5, 1968  H. W. JACOBSON  3,409,459
FLUIDIZED BED COATING OF TITANIUM-CHROMIUM ALLOY
Filed March 10, 1965  2 Sheets-Sheet 1

INVENTOR
HOWARD W. JACOBSON

BY  *Fred C. Carlson*
ATTORNEY

United States Patent Office 3,409,459
Patented Nov. 5, 1968

3,409,459
FLUIDIZED BED COATING OF TITANIUM-CHROMIUM ALLOY
Howard W. Jacobson, Wilmington, Del., assignor to E. I. du Pont de Nemours and Company, Wilmington, Del., a corporation of Delaware
Filed Mar. 10, 1965, Ser. No. 438,579
9 Claims. (Cl. 117—71)

ABSTRACT OF THE DISCLOSURE

The high-temperature oxidation resistance of articles composed of columbium, tantalum, columbium-base alloys, or tantalum-base alloys is improved by application of a coating composed of titanium and chromium, said coating being deposited by bringing the articles into contact with vapors of lower iodides of titanium and chromium at 900° to 1200° C. in a fluidized bed of suspended powder particles.

---

In one embodiment, the process is carried out in a fluidized bed reactor in which the fluidized bed comprises powdered titanium-chromium alloy, and, if desired, inert particles of silica, zirconia, thoria, or alumina in the proportion of up to 95% of the total bed weight, and through the fluidized bed there is circulated, along with the fluidizing gas, up to about 2% by volume of iodine vapor, based on the total volume of fluidizing gas. Under the conditions described, the titanium-chromium alloy powder in the fluidized bed reacts with iodine to form lower iodides of titanium and chromium and these lower iodides, coming into contact with the hot surface of the article to be coated, effect deposition of a uniform, adherent layer of titanium-chromium alloy on such surface.

In another embodiment of the invention lower iodides of titanium and of chromium are generated by a flow of iodine vapor over particles or chunks of titanium-chromium alloy contained in a pre-reactor, and these lower iodides of titanium and chromium are then introduced into a fluidized bed reactor to effect coating of the refractory metal articles.

In a preferred embodiment of the invention, the fluidized bed is composed of particles of titanium-chromium alloy only, and the lower iodides are generated within the reactor by means of a flow of iodine vapor diluted with an inert gas.

Figure 1:
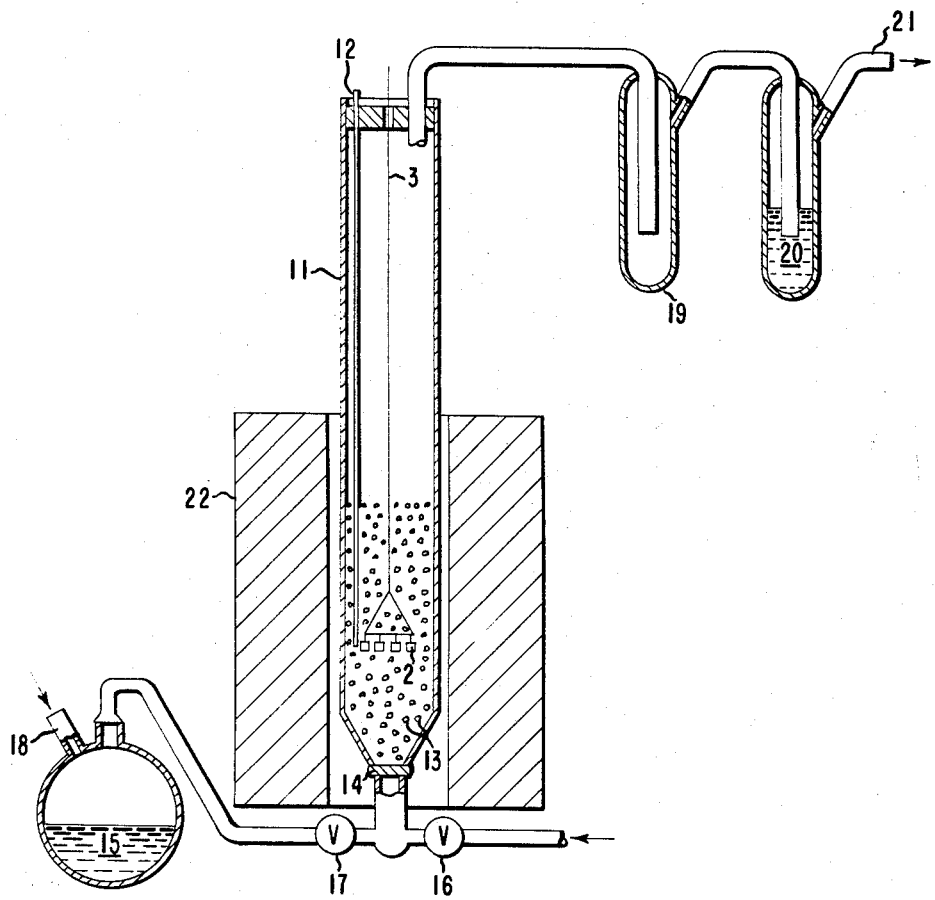

In the drawings:
FIGURE 1 shows a cross-sectional view of a fluid-bed apparatus for applying a titanium-chromium alloy coating to a refractory-metal base article, and
FIGURE 2 shows in cross-sectional view an apparatus for an alternative method of operation to achieve the same result.

In FIGURE 1, a quartz reactor 11 is used in which are suspended by refractory metal wire 3, the articles 2 to be coated. A thermocouple 12 is used to measure the temperature within the reactor adjacent to these articles. The fluidized bed of the reactor comprises particles 13 of titanium-chromium alloy, and may, if desired, also contain up to 95% by weight of particles of a material which is inert under the conditions of operation and is selected from the group consisting of silica, zirconia, thoria, and alumina. If an inert diluent is used, the proportion of titanium-chromium alloy powder in the fluidized bed may vary within the limits of 5 to 99+% by weight, a preferred amount of TiCr alloy being about 75% by weight of the total bed. The bed is fluidized by the upward flow of gas entering the reactor through a porous inlet 14. Carried into the reactor along with a flow of inert gas admitted through inlet 18, is a small amount of volatilized iodine from an outside vaporizer 15. Valves 16 and 17 control the flow of iodine and of inert gas into the reactor. The exhaust gases are drawn off from exit 21 through a solids traps 19 and a bubbler trap 20 for gases. Heat is supplied to the fluidized bed by furnace 22.

Figure 2:
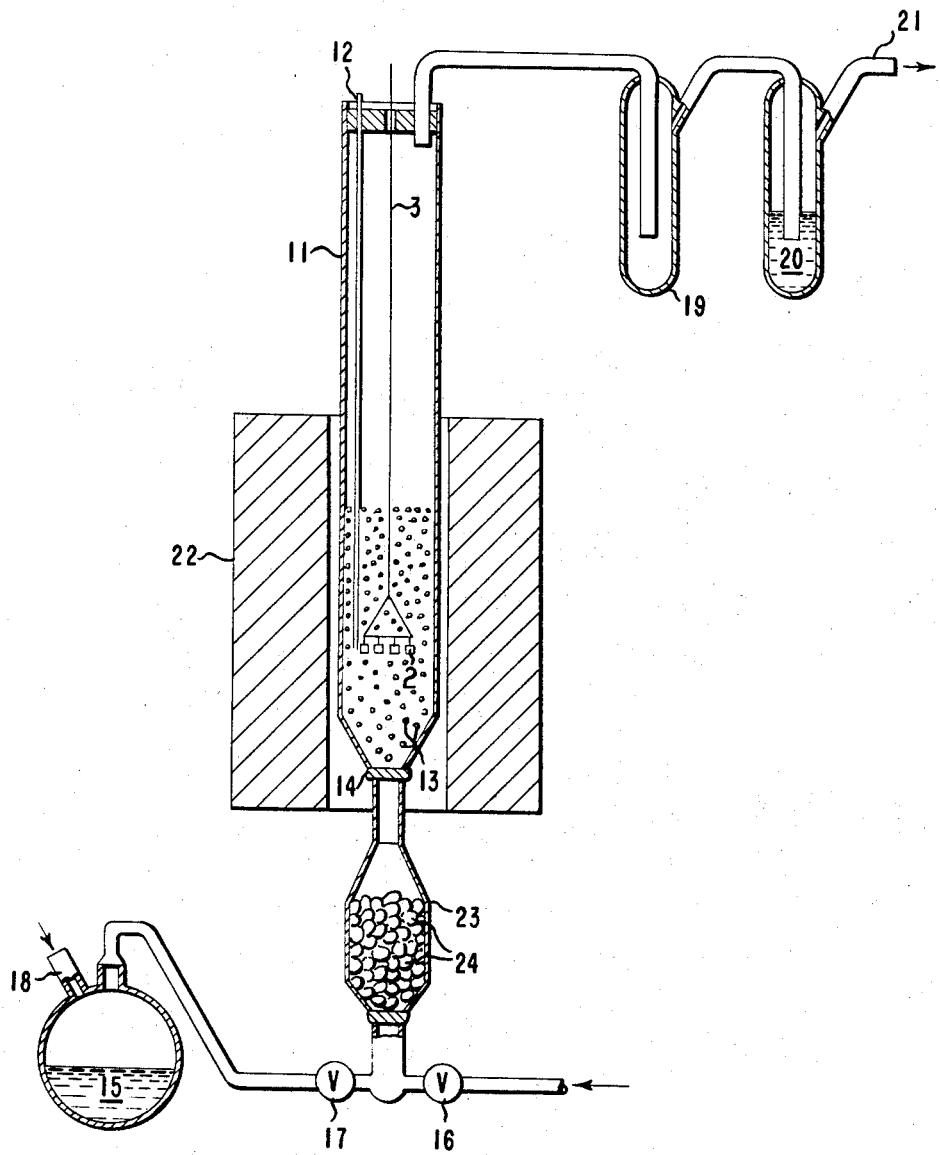

FIGURE 2 shows an apparatus which can be used in an alternative method of operation of the invention. In cross-sectional view there is shown the reactor configuration as in FIGURE 1, but with the addition of a quartz prereactor 23 which serves as a container for pieces of titanium-chromium alloy 24. The inert gas introduced through valve 16, together with the small amount of iodine vaporized from the iodine reservoir 15 and carried through valve 17 by the flow of inert gas entering the reservoir through inlet 18, passes over the TiCr alloy pieces and reacts with the alloy to form lower iodides of Ti and Cr, i.e. $TiI_2$ and $CrI_2$. These lower iodides are passed upward through the reactor containing the articles 2 to be coated in the fluidized bed. Although in the description of FIGURE 1 the fluidized bed has been described as comprising particles of TiCr alloy and an inert material of the group consisting of silica, zirconia, thoria, and alumina, the preferable method of operation, which will be described in detail below, in this instance has been found to be the use of a fluidized bed of TiCr particles alone.

For purposes of this invention the titanium-chromium alloys found most useful are those in which the weight ratio of Ti to Cr is from 70:30 to 30:70.

Many columbium-base and tantalum-base alloys have heretofore been produced which have shown considerable oxidation resistance at extremely high temperatures, and in addition have exhibited some degree of strength and fabricability even at elevated temperatures. However, the oxidation resistance of such alloys is not sufficient to permit extended exposure to oxidizing and corroding atmospheres at extremely high temperatures; hence greater advantage has been found in preparing refractory alloys which have the desired properties of fabricability and strength, and thereafter applying a coating to obtain the desired resistance to oxidation and corrosion of the refractory articles.

Coating processes for refractory metals and alloys must result in coatings which meet exacting requirements. The coatings must be extremely oxidation resistant at very high temperatures. Also, acceptable coatings must be completely compatible with the underlying metal base as regards physical characteristics. There must be compatibility of coefficient of expansion, so that the coating will not spall or crack under high temperatures and thermal and mechanical shock. If the coating process is to have real economic value it must be one by means of which complex shapes may be covered with an even, adherent protective coating. In addition, it is a distinct advantage if the coating process is one which may be carried out in a relatively short time in simple apparatus, and in which the process may be run continuously.

It is therefore an object of this invention to produce coated, oxidation-resistant articles comprising columbium-base and tantalum-base alloys, which articles are extremely stable under conditions of thermal and mechanical shock. Another object is to produce oxidation-resistant coatings on refractory metal articles, which coatings are extremely resistant to spalling and cracking. A further object is to provide processes by which articles of complex shape can be coated in a relatively simple apparatus and in short periods of time. A specific object is to produce strong, oxidation-resistant articles, comprising columbium- and tantalum-base alloys, having on their surfaces an adherent, uniform covering of titanium-chromium alloy. A further specific object of this invention is to prepare coated refractory-metal-base articles to which may be applied an overlay of silicon, by means of which silicide coatings are formed on refractory metal articles, further enhancing their resistance to oxidation.

The foregoing and related objects of this invention have been achieved by the operation of a fluidized bed comprising powdered titanium-chromium alloy, which is fluidized by the upward flow of an inert gas such as argon, helium, or other noble gas, containing a small and carefully controlled amount of iodine vapor. The fluidized bed may be composed of titanium-chromium alloy powder only, or it may be composed of titanium-chromium alloy powder and an inert material such as, for example, silica, zirconia, thoria, or alumina. The temperature of the reactor is controlled so that the titanium-chromium alloy powder is reacted with the iodine vapor introduced with the fluidizing gases into the reactor, to produce the lower iodides of titanium and chromium, $TiI_2$ and $CrI_2$. These lower iodides of titanium and chromium, when in contact with the hot surfaces of the columbium- or tantalum-base alloy articles to be coated, undergo chemical reaction generally termed "cracking," which results in the deposition of titanium-chromium alloy upon such surfaces.

FIGURES 1 and 2, respectively, illustrate apparatuses useful in carrying out two methods of this invention. The method used in FIGURE 2 differs from that used in FIGURE 1 in that the lower iodides of titanium and of chromium are generated by reacting iodine vapor with titanium-chromium alloy chunks or powder in a pre-reactor at 700 to 850° C. These lower iodides are then carried into a fluidized bed reactor where the maintenance of the lower valence condition is assured by the presence of additional titanium-chromium alloy powder. An inert material can also be used in the fluidized bed reactor, this material assisting in the distribution of the lower iodides so that the surface of the articles is evenly treated. It has been found however, that the process of this invention may be operated more economically using a fluidized bed consisting only of titanium-chromium alloy powder, with the amount of iodine vapor introduced being carefully controlled at up to about 2% by volume so that the iodides of titanium and chromium which are produced within the reactor are all in a low-valence state. As in the alternative method of operation, the lower iodides form titanium-chromium alloys upon contact with the metal surface of the articles to be coated. Iodine vapor is again set free to react with additional titanium-chromium alloy powder to form additional lower iodides.

In either of these methods of operation the chemical reactions which take place to effect the desired coating on the refractory alloy articles are believed to be as follows:

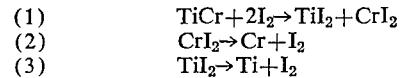

(1)         $TiCr + 2I_2 \rightarrow TiI_2 + CrI_2$
(2)         $CrI_2 \rightarrow Cr + I_2$
(3)         $TiI_2 \rightarrow Ti + I_2$ One theoretical explanation which appears to fit the facts is that the elemental Cr and Ti which are formed in Reactions 2 and 3 are plated as Ti-Cr alloys upon the surface of the articles to be coated, and the iodine vapor produced reacts with additional TiCr from the fluidized bed to produce additional lower iodides as shown in Equation 1. In any event, these equations are useful in calculating the stoichiometry of the processes.

It has been found that refractory-metal-base articles coated according to processes of this invention show exceptional resistance to oxidation, thermal and mechanical shock, spalling and cracking under extremely severe conditions if an overlay of silicon is applied to the Ti-Cr coated articles. This protective overlay of silicon can be applied by various means—for example, by a pack cementation process. However, it is preferred to apply the overlay of silicon by a process similar to that used to apply the TiCr coating: that is, to employ a fluidized bed in which iodine vapor is reacted with silicon to form a silicon iodide which "cracks" when in contact with the hot metal surface of the TiCr-coated refractory-metal-base articles to form silicon and iodine. The iodine is set free to react with more silicon from the fluidized bed and the process of silicon coating is continued. Under the conditions of operation of this invention the underlying refractory-base-metal, the TiCr alloy of the coating, and the silicon which is overlaid on this form complex Nb- or Ta-Ti-Cr-Si alloys which are very resistant to severe oxidizing conditions at high temperatures.

Refractory metal articles coated by processes of this invention have been tested for resistance to oxidation by repeated heating in air and cooling. Such cyclic tests are carried out by heating the specimens to a designated temperature, say 1370° C. (2500° F.), in a muffle furnace in flowing air, and holding them at the chosen temperature level for a period of 1 hour. The articles are then removed from the furnace and permitted to cool in air to room temperature, this cooling being accomplished in about 5 minutes. Maintaining the article at the elevated temperature for a specified period of time and cooling rapidly to room temperature is considered to be on "thermal cycle" in oxidation testing. A 1 hour thermal cycle includes a period of about 55 minutes at the elevated temperature and about 5 minutes cooling to room temperature.

The invention will be better understood by reference to the following illustrative examples:

Example 1

To prepare titanium-chromium coated refractory metal articles a reactor as is shown in FIGURE 1 was used. The reactor was made of silica and was 3½ ft. in height by 4" in diameter. There was charged into this reactor a sand-alloy bed which contained about 75% by weight of a 50–50 (wt. percent) Ti-Cr alloy and about 25% by weight of high purity sand, each powder in the −20 +60 mesh size range. The reactor was filled to a depth of about 10" with the sand-alloy mixture. Within the reactor and above the sand-alloy bed were suspended, by means of tantalum wire, three coupons of columbium-base alloy to be coated. These specimens were composed of D-36 alloy (10% Ti, 5% Zr, balance Nb), and were 1.5" square by 0.012" thick.

The silica-alloy bed was fluidized by an upward flow of argon and heating of the reactor was begun. When the bed had reached an operating temperature of about 1100° C., it was found that the flow of argon necessary to keep the bed properly fluidized was a velocity of about ½ ft. per second. When the bed was fluidized, it was of sufficient depth so that the articles to be coated were within the bed itself.

When operating temperature (1100° C.) had been attained, a small amount of iodine vapor was introduced along with the inert gas to fluidize the bed. The proportion of iodine in the gas was about from 1 to 2% by volume.

The operation as just described was continued for a period of 6 hours, at the conclusion of which time the specimens were raised to the upper part of the reactor, the flow of iodine vapor to the reactor was stopped, and the reactor was allowed to cool until the specimens had reached a temperature of 300° C. At this temperature the samples were removed from the reactor, allowed to cool to room temperature and were examined.

One of the specimens was cut in cross section. It was found that a titanium-chromium alloy coating had been formed on each side of the metal coupon. The coating was found to be of even thickness over the complete area of the coupon, and was found to be completely adherent to the underlying alloy base. Analysis showed the alloy of the coating to be near a weight ratio of 40/60 in Ti/Cr.

The cross-section of the coated alloy coupon also was analyzed by means of an X-ray microprobe. By plotting concentration levels of the metals present in the refractory alloy base and in the applied coating against the depth of cross-sectioned coupon it was found that as the outside edge of the sample was approached the concentration of niobium decreased, but that some niobium, to the extent of 2 to 4%, was present even at the outer margin of the sample. Titanium, being one of the constituents of the refractory alloy being coated, was shown to be present in the alloy, but its concentration increased markedly at the point where the coating of TiCr began. Chromium, not being one of the alloying elements in the article to be coated was shown at zero level in the matrix and increased in concentration as the coating was scanned. This analysis showed that the coating which had been applied was a complex system comprising not only the TiCr alloy, but also metals which were constituents of the articles being coated. These constituents were present to the outside margin of the coating.

Example 2

The two remaining coated coupons from Example 1 were treated as follows:

The Ti-Cr coated specimens were suspended by tantalum wire in the upper part of a quartz reactor 4" in diameter and 40" high as is shown in FIGURE 1. The reactor was charged to a level of about 2" with silicon of $-20 +40$ mesh size. Over this silicon was charged very pure silica powder of $-40 +80$ mesh size to a level of about 12" in the reactor. The reactor was connected to a bulb-type vaporizer in which 450 grams of iodine was placed and through which vaporizer a flow of argon was passed to carry iodine vapor into the reactor. Through the bottom inlet of the reactor, argon was fed at a velocity of 0.2 to 0.3 ft. per second, whereby the bed of silicon and silica was fluidized. The iodine vaporizer was heated to 120 to 130° C. and a flow of argon was started over the iodine to carry the vapor into the reactor. The reactor was heated to a temperature of about 900° C. and the specimens previously coated with TiCr were lowered into the upper portion of the fluidized bed. The operation was continued for a period of 4 hours. At the conclusion of this time the suspended samples were raised above the fluidized bed level, the iodine flow was cut off, heating was discontinued and the reactor was cooled while the flow of argon was continued.

When the temperature of the reactor had fallen to 300° C., the samples were removed. One of the two samples was cross-sectioned so that it could be examined both visually and by X-ray probe to determine the composition of the coating. The X-ray probe showed the following:

The external coating was a titanium-chromium silicide containing a minor amount of columbium. The titanium-chromium silicide layer was about 50 microns deep, and beneath this there appeared a 50 micron layer consisting of a chromium-titanium-rich columbium alloy.

The remaining coated D36 coupon was tested for high temperature oxidation by the thermal cycling test described above. The specimen was held at a temperature of 1370° C. for 55 minutes in flowing air and cooled to approximately room temperature in 5 minutes in flowing air. After 70 such 1-hour cycles the specimen showed no evidence of spalling or cracking and a weight gain of not over 10 milligrams per sq. cm., indicating that essentially no oxidation had taken place.

Example 3

Using a silica reactor with a pre-reactor container for chunks of TiCr alloy as is shown in FIGURE 2, three coupons of D43 alloy (10% W, 1% Zr, 0.1% C, balance Nb) measuring 1.5" x 1.5" x 0.012" were coated. In this operation the main reactor, a silica tube 3½ ft. in height by 4" diameter, was charged with a silica-TiCr alloy mixture, the weight ratio of TiCr alloy powder to silica being 25 to 75. Each of the powders was within a particle size range of $-20 +40$ mesh. The pre-reactor, a silica tube about 6 inches in length of 4" diameter, was charged to about ½ its depth with chunks ($-4 +10$ mesh) of TiCr alloy of the same composition as the TiCr alloy powder used in the main (fluidized) reactor bed. This alloy was 50–50 TiCr by weight.

The coating operation was carried out in the manner described in Example 1, except that the TiCr alloy chunks in the pre-reactor were heated to 700° C. to 800° C. before the flow of iodine was begun. Gas flow was continued for a period of 6 hours, during which the temperature of the pre-reactor was held at about 750° C. and the temperature of the fluidized bed was held at about 1100° C. At the conclusion of the 6 hour run, the coated samples were raised above the fluidized bed level, the flow of iodine was discontinued, and the temperature of the reactor was allowed to fall to 300° C. The three coated coupons were then removed from the reactor and one of them was cut in cross section and examined.

It was found that a coating 0.72 mil in thickness had been deposited on each surface of the D43 coupon. Analysis of this coated surface showed the presence of TiCr alloy of about 60–40 Ti-Cr composition. The coating was completely adherent to the underlying metal and was of even depth at all places on the coupon.

A cross section of this coated specimen was also analyzed by means of an X-ray microprobe. It was found that as the outer margin of the coated specimen was approached, the concentration of metals comprising the matrix of the coupon, i.e. niobium and tungsten, decreased but that even at the outer margin of the coating some of each of these elements was present. At the point where the coating layer began, the Ti concentration increased more rapidly than did that of the chromium. The coating was thus found to comprise both the TiCr alloy put on as a coating layer and elements from the underlying base also.

According to the process described in Example 2, the remaining two coupons of D43 were placed in a second reactor containing a charge of silicon metal and sand and were coated with an overlay of silicon to a depth of 0.002" during a period of 4 hours of operation.

The two coated coupons were removed from the reactor, one was cross-sectioned and analyzed by microprobe, and the other was tested in thermal cycling. The specimen analyzed by microprobe showed the coating to comprise not only the metals applied by the coating process, but also some of each of the metals of the underlying alloy. The specimen tested for high temperature oxidation resistance remained unaffected by this severe test after 120 one-hour cycles at 2200° F.

Examples 4 and 5

Two additional experiments were carried out employing the coating process as is described in Example 3, except that lower temperatures were used in the fluidized bed reactor where the coating of the coupon was taking place. The coupons coated were three specimens 1.5" x 1.5" x 0.012" of D36 alloy. In each case the coating operation was carried out for a period of 6 hours exactly as described in Example 3 except that the bed temperature was lower than in the previous run.

As described in Example 2, the alloy coupons coated with TiCr alloy were removed from the reactor and placed in a second fluid bed reactor and coated, in a 4-hour operation, with an overlay of silicon. One specimen from each run was cut in cross section and examined visually and by microprobe.

Results of these experiments are as follows:

| Example | Temp. of Operation to Effect TiCr Coating, °C. | Depth of TiCr Coating Deposited, in. | Oxidation Testing of TiCr-Si Coated Specimen [1] |
|---------|------|-------|----------------------|
| 4       | 925  | 0.066 | Unaffected by oxidation after 100 cycles. |
| 5       | 1,025 | 0.084 | Unaffected by oxidation after 115 cycles. |

[1] Thermal Cycle: 1,370° C. for 55 mins.; cooled for 5 mins.

It has been found that for the successful operation of this invention, it is required that conditions be maintained, as set forth in the appended claims, which will effect the generation of lower iodides of titanium and chromium. A low iodine concentration i.e., below about 2% by volume in the fluidizing gas feed and the presence of a large excess of TiCr alloy assures the generation of metal iodides of low valence.

As will be noted from the depth of coatings of TiCr which were deposited when temperatures from 925° C. to 1100° C. were used in the fluidized bed operation, the higher temperatures gave higher rates of deposition of alloy, and the coatings applied at the higher temperatures were as adherent and uniform as those applied at lower temperatures. At 925° C., an increase in concentration of iodine in the fluidizing gas stream resulted in a lower deposition rate for TiCr on the alloy coupons. At 925° C. an iodine flow rate of 4 grams per hour gave a TiCr deposit of 0.11 mil per hour, while an iodine flow rate of 8 grams per hour lowered the deposition rate of TiCr to 0.01 mil per hour.

Analysis of the bed particles of the TiCr bed after 6 and 12 hours of operation has shown that no change in the alloy composition of the bed particles takes place during the operation, after these time intervals.

Although in the specific examples of the operation of this invention described above a fluidized bed comprising powdered TiCr alloy has been employed, it is equivalent, and hence within the scope of this invention, to employ an apparatus as shown in FIGURE 2 which comprises a pre-reactor containing TiCr alloy in combination with a reactor containing a fluidized bed of inert particles only. In this method of operation it is necessary that there be present a large excess of TiCr alloy over the stoichiometric quantity required to form lower iodides with the iodine vapor introduced, so that the formation of lower iodides of Ti and Cr are formed. The introduction of only small amounts of iodine vapor to the pre-reactor containing the TiCr alloy also assures the formation of lower iodides. When all of the TiCr alloy of the reaction is contained in the pre-reactor, a preferred method is to operate this prereactor as a fluidized bed of TiCr particles fluidized by the introduction of an inert gas containing a small amount of iodine vapor. The TiCr alloy preferably is in the −20 +60 mesh particle range and in the fluid bed operation. This furnishes a lage surface area for reaction with iodine vapor to form lower iodides which subsequently pass to the reactor containing the inert particles and effect coating of the refractory-base articles contained therein. If all of the TiCr alloy to be reacted is contained in a pre-reactor, the temperature of this bed should be kept in a range of 700 to 850° C. in order to effect the formation of the lower iodides.

The application of the silicon overlay, which increases the oxidation resistance of the coated articles, has been carried out in a reactor of the same size and under similar operating conditions to those employed for the application of the TiCr coating.

In a further embodiment of the invention, a second pre-reactor may be connected with the same system which has been described immediately above, this second pre-reactor containing powdered silicon, and, if desired, some inert particles also. By proper manipulation of valves and control of iodine concentration and inert gas flow, and temperatures, the refractory-metal base articles contained in the fluidized bed reactor may first be coated with TiCr alloy from lower iodides generated in a first pre-reactor, and then coated with an overlay of silicon from lower iodides generated in a second pre-reactor. By this method of operation, one fluidized bed reactor containing a bed of inert particles and the articles to be coated can serve for the application of two or more different coating compositions, without the necessity of removing the coated articles from the reactor until the complete coating operation has been accomplished.

I claim:

1. In a process for coating a refractory-metal-base article, said metal being selected from the group consisting of columbium, columbium-base alloys in which the columbium content is at least 50% by weight, tantalum, and tantalum-base alloys in which the tantalum content is at least 50% by weight, the step comprising heating said refractory-metal-base article, within a temperature range of about from 900° C. to 1200° C., in a fluidized bed comprised of powdered particles selected from the group consisting of (A) titanium-chromium alloy, (B) an inert material selected from the group consisting of silica, zirconia, thoria and alumina, and (C) combinations of (A) and (B), the gas employed for fluidizing said bed containing vaporized lower iodides of titanium and chromium, whereby there is deposited on the surface of said refractory-metal base article an adherent coating comprising titanium and chromium.

2. In a process for coating a refractory-metal-base article, said metal being selected from the group consisting of columbium, columbium-base alloys in which the columbium content is at least 50% by weight, tantalum, and tantalum-base alloys in which the tantalum content is at least 50% by weight, the step comprising heating said refractory-metal-base article within a temperature range of about from 900° C. to 1200° C. in a fluidized bed comprising particles of titanium-chromium alloy and up to 95% by weight of an inert material selected from the group consisting of silica, zirconia, thoria, and alumina, the gas employed for fluidizing said bed containing vaporized lower iodides of titanium and chromium, whereby there is deposited on the surface of said refractory-metal-base article an adherent coating comprising titanium and chromium.

3. In a process for coating a refractory-metal-base article, said metal being selected from the group consisting of columbium, columbium-base alloys in which the columbium content is at least 50% by weight, tantalum, and tantalum-base alloys in which the tantalum content is at least 50% by weight, the steps of (1) generating a vapor of lower iodides of titanium and chromium by passing iodine vapor over titanium-chromium alloy at a temperature within the range of 700 to 850° C., (2) introducing said vapor of lower iodides of titanium and chromium together with additional fluidizing gas into a bed comprised of powder particles selected from the group consisting of (A) titanium-chromium alloys, (B) an inert material selected from the group consisting of silica, zirconia, thoria, and alumina, and (C) combinations of (A) and (B), at a velocity sufficient to fluidize said bed, the vapor of step (1) containing iodine up to 2% by volume based on the total volume of fluidizing gas, and (3) suspending said refractory metal article in said fluidized bed at a temperature within the range of about from 900° C. to 1200° C., whereby there is deposited on the surface of said article an adherent coating comprising titanium and chromium.

4. A process according to claim 3 in which the vapor of lower iodides used in step (2) is generated in situ in the fluidized bed and said bed consists essentially of particles of titanium-chromium alloy fluidized by the upward flow of gases comprising up to about 2% by volume of iodine vapor.

5. In a process for coating a refractory-metal-base article, said metal being selected from the group consisting of columbium, columbium-base alloys in which the columbium content is at least 50% by weight, tantalum, and tantalum-base alloys in which the tantalum content is at least 50% by weight, the steps of (1) generating a vapor of lower iodides of titanium and chromium by passing iodine vapor over titanium-chromium alloy having a Cr:Ti weight ratio of about from 70:30 to 30:70 at a temperature within the range of 700 to 850° C., (2) introducing said vapor of lower iodides of titanium and chromium, together with additional fluidizing gas, into a fluidized bed reautor, said fluidized bed comprising powder particles of titanium-chromium alloy and up to 95% by weight of powder particles of an inert material selected from the group consisting of silica, zirconia, thoria, and alumina and being operated at a temperature within the range of about from 900° C. to 1200° C., the vapor of step (1) containing iodine up to 2% by volume based on the total volume of fluidizing gas, and (3) suspending said refractory metal base article in said suspended bed, whereby there is deposited on the surface of said article an adherent coating comprising titanium and chromium.

6. In a process for coating a refractory-metal-base article, said metal being selected from the group consisting of columbium, columbium-base alloys in which the columbium content is at least 50% by weight, tantalum, and tantalum base alloys in which the tantalum content is at least 50% by weight, the steps comprising heating said refractory-metal-base article within a temperature range of about from 900 to 1200° C., in a fluidized bed comprised of powder particles selected from the group consisting of (A) titanium-chromium alloy, (B) an inert material selected from the group consisting of silica, zirconia, thoria, and alumina, and (C) combinations of (A) and (B), the gas employed for fluidizing said bed containing vaporized lower iodides of titanium and chromium, whereby there is deposited on the surface of said refractory-metal base article an adherent coating comprising titanium and chromium, and thereafter heating said coated article, within a temperature range of about from 900 to 1200° C., in a fluidized bed comprising powder particles selected from the group consisting of (A) silicon, (B) an inert material selected from the group consisting of silica, zirconia, thoria, and alumina, and (C) combinations of (A) and (B), the gas employed for fluidizing said bed containing iodine vapor, whereby an adherent coating comprising silicon is deposited upon the surface of the coated article.

7. In a process for coating a refractory-metal base alloy article, said metal being selected from the group consisting of columbium, columbium-base alloys in which the columbium content is at least 50% by weight, tantalum, and tantalum-base alloys in which the tantalum is at least 50% by weight, the steps comprising heating said refractory metal base article within a temperature range of about from 900 to 1200° C. in a fluidized bed comprising particles of titanium-chromium alloy and up to 95% by weight of an inert material selected from the group consisting of silica, zirconia, thoria and alumina, the gas employed for fluidizing said bed containing vaporized lower iodides of titanium and chromium, whereby there is deposited on the surface of said refractory-metal-base article an adherent coating comprising titanium and chromium, and thereafter heating said coated article, within a temperature range of about from 900 to 1200° C., in a fluidized bed of powder particles selected from the group consisting of (A) silicon, (B) an inert material selected from the group consisting of silica, zirconia, thoria and alumina, and (C) combinations of (A) and (B), the gas employed for fluidizing said bed containing a vaporized iodide of silicon, whereby an adherent coating comprising silicon is deposited on the surface of the coated article.

8. In a process for coating a refractory-metal-base article, said metal being selected from the group consisting of columbium, columbium-base alloys in which the columbium content is at least 50% by weight, tantalum, and tantalum-base alloys in which the tantalum content is at least 50% by weight, the steps of (1) generating a vapor of lower iodides of titanium and chromium by passing iodine vapor over titanium-chromium alloy having a Cr:Ti weight ratio of about from 70:30 to 30:70, at a temperature within the range of 700 to 850° C., (2) introducing said vapor of lower iodides of titanium and chromium together with additional fluidizing gas into a bed comprised of powder particles selected from the group consisting of (A) titanium-chromium alloy, (B) an inert material selected from the group consisting of silica, zirconia, thoria and alumina, and (C) combinations of (A) and (B), at a velocity sufficient to fluidize said bed, the vapor of step (1) being present up to 2% by volume, based on the total volume of fluidizing gas and (3) suspending said refractory metal article in said fluidized bed at a temperature within the range of about from 900 to 1200° C., whereby there is deposited on the surface of said article an adherent coating comprising titanium and chromium, and (4) thereafter heating said coated article, within a temperature range of about from 900 to 1200° C., in a fluidized bed comprised of powder particles selected from the group consisting of (A) silicon, (B) an inert material selected from the group consisting of silica, zirconia, thoria and alumina, and (C) combinations of (A) and (B), the gas employed for fluidizing said bed containing a vaporized iodide of silicon, whereby an adherent coating comprising silicon is deposited upon the surface of the coated article.

9. A process of claim 8 wherein the vaporized iodide of silicon used in step (4) is generated in situ in the fluidized bed by passing a gas containing iodine vapor in contact with powdered silicon, and said bed consists essentially of particles of silicon, fluidized by the upward flow of gases containing up to 10% by volume of iodine vapor.

References Cited

UNITED STATES PATENTS

| | | | |
|---|---|---|---|
| 2,887,407 | 5/1959 | Koch | 117—107.2 |
| 2,978,316 | 4/1961 | Weir. | |
| 3,081,530 | 3/1963 | Wlodek | 29—198 X |
| 3,090,702 | 5/1963 | Commanday | 117—106 |
| 3,178,308 | 4/1965 | Oxley et al. | 117—106 |
| 3,202,537 | 8/1965 | Norman et al. | 117—100 |
| 3,252,823 | 5/1966 | Jacobson et al. | 117—107.2 X |
| 3,293,068 | 12/1966 | Bradley et al. | 117—107.2 |

ALFRED L. LEAVITT, *Primary Examiner.*

A. GOLIAN, *Assistant Examiner.*